United States Patent [19]

Kobaybashi et al.

[11] Patent Number: 5,567,133
[45] Date of Patent: Oct. 22, 1996

[54] CANNED MOTOR AND PUMP EMPLOYING SUCH CANNED MOTOR

[75] Inventors: Makoto Kobaybashi; Masakazu Yamamoto; Yoshio Miyake; Koji Isemoto, all of Kanagawa-ken, Japan

[73] Assignee: Ebara Corporation, Tokyo, Japan

[21] Appl. No.: 275,528

[22] Filed: Jul. 15, 1994

[30] Foreign Application Priority Data

Jul. 16, 1993 [JP] Japan ................................. 5-199291

[51] Int. Cl.[6] ........................................... F04B 35/04
[52] U.S. Cl. ...................... 417/423.7; 417/350; 417/357; 417/366; 417/423.14; 415/912
[58] Field of Search .................................. 417/350, 357, 417/365, 366, 423.7, 423.12, 423.14; 415/214.1, 912

[56] References Cited

U.S. PATENT DOCUMENTS

| | | |
|---|---|---|
| 2,524,269 | 10/1950 | Patterson . |
| 2,763,214 | 9/1956 | White . |
| 3,347,168 | 10/1967 | Nixon ................................. 417/350 |
| 3,494,291 | 2/1970 | Carter, Jr. et al. ................ 417/423.12 |
| 3,704,078 | 11/1972 | Conery et al. ...................... 417/423.7 |
| 4,516,915 | 5/1985 | Jensen et al. ........................... 417/366 |
| 5,151,016 | 9/1992 | Her .......................................... 417/366 |
| 5,385,454 | 1/1995 | Kobayashi et al. ................ 417/423.12 |
| 5,388,971 | 2/1995 | Kobayashi et al. ................ 417/423.14 |
| 5,401,146 | 3/1995 | Moriya et al. ........................ 415/214.1 |

FOREIGN PATENT DOCUMENTS

| | | |
|---|---|---|
| 0 566 088 | 10/1993 | European Pat. Off. . |
| 32 39 601 | 5/1983 | Germany . |
| 6050282 | 2/1994 | Japan ................ 417/423.14 |
| 2 007 770 | 5/1979 | United Kingdom . |

*Primary Examiner*—Charles G. Freay
*Attorney, Agent, or Firm*—Oblon, Spivak, McClelland, Maier & Neustadt, P.C.

[57] ABSTRACT

A canned motor for use in a pump has an outer frame casing fitted over a stator, a pair of side frame members welded to respective open ends of the outer frame casing, a can fitted in the stator and joined to the side frame members, and an outer cylinder disposed around the outer frame casing with an annular spaced defined therebetween, the outer cylinder being welded to the outer frame casing. The outer cylinder has a pair of flanges disposed respectively on axially spaced open ends thereof for attachment to components of a pump assembly and holding a fluid being handled within the outer cylinder. The outer cylinder has a hole defined in an outer circumferential wall thereof for passing leads for connection to a power supply.

20 Claims, 13 Drawing Sheets

CANNED MOTOR AND PUMP EMPLOYING SUCH CANNED MOTOR

BACKGROUND OF THE INVENTION

1. Field of the Invention

The present invention relates to a canned motor having casings made of sheet metal such as stainless steel or the like and a pump employing such a canned motor, and more particularly to a canned motor having a welded structure which lends itself to a wide variety of pump designs and a pump employing such a canned motor.

2. Description of the Prior Art

There have heretofore been full-circumferential flow pumps designed for cooling the motor and reducing noise from the motor. Strong demands for pumps of non-seal structure which do not have sealing devices such as mechanical seals or the like are met by canned motor pumps and magnet drive pumps. The greatest requirement which present pumps have to meet is a reduction in size. One effort to meet the requirement is directed to increase the rotational speed of the motor with a frequency converter such as an invertor or the like. It has been customary to protect pumps from corrosive water by encasing the pump with a housing made of pressed corrosion-resistant stainless sheet.

Generally, pumps can be classified into different structures including multistage pumps and double-suction pumps by performance limitations, and also classified into ground-installed pumps and submerged pumps by limitations on the environment in which they are used.

Four main requirements to be met by pumps are thus summarized as (1) silence, (2) small size, (3) non-sealed structure, and (4) corrosion resistance. However, actual technical limitations have prevented pumps which satisfy all the four requirements from being produced so far. Accordingly, manufacturers have been required to produce a wide variety of pumps. Conventional full-circumferential flow pumps have also been categorized into different structures, and it has been necessary for manufacturers to produce full-circumferential flow pumps of different structures though they have the same output power. Such a conventional practice has been poor in productivity.

SUMMARY OF THE INVENTION

It is an object of the present invention to provide a canned motor having a welded structure which lends itself to a wide variety of pump designs and a pump employing such a canned motor.

According to the present invention, the above object can be achieved by a canned motor for use in a pump, comprising: a stator; an outer frame casing disposed around the stator and having a pair of axial open ends; a pair of side frame members welded to the open ends, respectively, of the outer frame casing; a can fitted in the stator and joined to the side frame members; a shaft rotatably disposed in the stator; a rotor mounted on the shaft and disposed in the can; and an outer cylinder made of sheet metal disposed around the outer frame casing with an annular space defined therebetween, the outer cylinder being welded to the outer frame casing; wherein the outer cylinder has a pair of flanges disposed respectively on axially spaced open ends thereof for attachment to components of a pump assembly and holding a fluid being handled within the outer cylinder, the outer cylinder having a hole defined in an outer circumferential wall thereof for passing leads for connection to a power supply.

According the present invention, there is also provided a pump comprising: a common canned motor unit for use in a pump, the common canned motor unit comprising a stator, an outer frame casing disposed around the stator and having a pair of axial open ends, a pair of side frame members welded to the open ends, respectively, of the outer frame casing, a can fitted in the stator and joined to the side frame members, a shaft rotatably disposed in the stator, a rotor mounted on the shaft and disposed in the can, and an outer cylinder of sheet metal disposed around the outer frame casing with an annular space defined therebetween, the outer cylinder being welded to the outer frame casing, the outer cylinder having a pair of flanges disposed respectively on axially spaced open ends thereof for attachment to components of a pump assembly and holding a fluid being handled within the outer cylinder, the outer cylinder having a hole defined in an outer circumferential wall thereof for passing leads for connection to a power supply; a plurality of pump units each having at least one impeller and a pump casing housing the impeller; and a casing unit having a casing with a discharge port defined therein; the arrangement being such that one of the pump units is selected, the pump casing thereof is connected to at least one of the flanges of the outer cylinder, and the impeller is fixedly mounted on an end of the shaft, and that either one of the pump units or the casing unit is selected, and when one of the pump units is selected, the pump casing thereof is connected to the other of the flanges of the outer cylinder, and the impeller is fixedly mounted on the other end of the shaft, and when the casing unit is selected, the casing is connected to the other of the flanges of the outer cylinder.

The canned motor or canned motor unit has the annular space defined between the outer cylinder and the outer frame casing, and the outer cylinder has the flanges on its open ends for attachment to components of a pump assembly. Any of various pumps can be achieved by connecting desired pump units to the attachments.

Each of the side frame members may have a socket-and-spigot joint for holding a pump assembly. If the side frame members were of a welded structure, then it would be difficult to keep the side frame members concentric with the outer cylinder due to thermal strains caused when welded. Such a problem can be solved by holding pump components in engagement with the side frame members through the socket-and-spigot joint. The outer cylinder may be made of sheet metal, so that the motor can be manufactured with high productivity. The sheet metal can easily be deformed under an internal pressure or external forces applied during operation of the pump. Because of such deformations and welding-induced strains, it would be highly difficult to keep the side frame members concentric with the outer cylinder. It is therefore indispensable for the side frame members to have the socket-and-spigot joints.

Each of the flanges extends radially outwardly from one of the open ends of the outer cylinder. A similar flange on a pump component may be fastened to the flange of the outer cylinder by clamping flanges with a seal member interposed therebetween for holding the fluid in the outer cylinder. The clamping flanges are not required to be corrosion-resistant as they are not in contact with the fluid. Depending on the type of the pump, installation legs may be joined to the casing flanges.

The outer frame casing may also be made of sheet metal, and may have a pressed hollow rib projecting radially outwardly and joined to the outer cylinder. With this arrangement, it is possible to reinforce the outer cylinder and the outer frame casing for defining the annular space inexpensively, without having to weld stays or other members to the outer cylinder and the outer frame casing.

The flanges on the ends of the outer cylinder may be formed by spinning the ends of a pipe of sheet metal. Since the hollow rib on the outer frame casing may be produced by pressing a welded pipe of sheet metal, it is not necessary to employ a separate production facility even if the motor is of an elongate dimension for an increased output power. When the outer frame casing and the outer cylinder are fixed to each other, it is difficult to keep the side frame members concentric with the outer cylinder. However, since the side frame members have the respective socket-and-spigot joints, no problem arises in the assembling of the pump.

The opposite ends of the motor may be identical in shape and dimension to each other. As a result, some pump components may be shared or used in common, making it efficient to manufacture double-suction pumps. The outer cylinder may have a discharge hole defined in the outer circumferential wall thereof for discharging the fluid from the annular space, and the canned motor may further comprise a short discharge pipe welded to an outer circumferential surface of the outer cylinder in registry with the discharge hole. Such a structure makes it possible to manufacture an end-top pump or a double-suction pump with ease. Since the discharge hole may be defined in the outer cylinder and the short discharge pipe may be welded after the motor has been manufactured, these manufacturing steps may be carried out as common steps.

The canned motor may have a short pipe welded to an outer circumferential surface of the outer cylinder in registry with the hole for passing leads for connection to a power supply. This arrangement allows a submerged pump to be manufactured easily. Since the short pipe may be welded after the motor has been manufactured, this manufacturing step may be carried out as a common step.

Furthermore, the canned motor may further comprise a pair of bearing brackets fixed to the side frame members, respectively, a pair of radial bearings supported by the bearing brackets, respectively, the shaft being rotatably supported by the radial bearings, a pair of stationary thrust sliding surfaces disposed on respective axial ends of each of the radial bearings, a pair of rotatable thrust sliding surfaces disposed one on each side and held slidingly against the stationary thrust sliding surfaces, one of the side frame members, which is positioned on an anti-thrust load side, having a socket defined therein, one of the bearing brackets being inserted in the socket and held axially against a corresponding one of the side frame members. As a consequence, when the material and dimensions of the bearings are to be changed depending on the conditions in which the canned motor is used, the bearings and the bearing brackets may be replaced in sets, thus meeting a wide range of design requirements. It is possible to manufacture an in-line pump which is subject to a high fluid pressure in its suction port by adding a suction bracket which is slidably held against the impeller, to the bearing bracket.

The other of the side frame members, which is positioned on a thrust load side, may have a socket defined therein, the other of the bearing brackets being inserted in the socket and held axially against the other of the side frame members. With this construction, when the material and dimensions of the bearings are to be changed depending on the conditions in which the canned motor is used, the bearings and the bearing brackets may also be replaced in sets, thus meeting a wide range of design requirements.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

Figure 1:
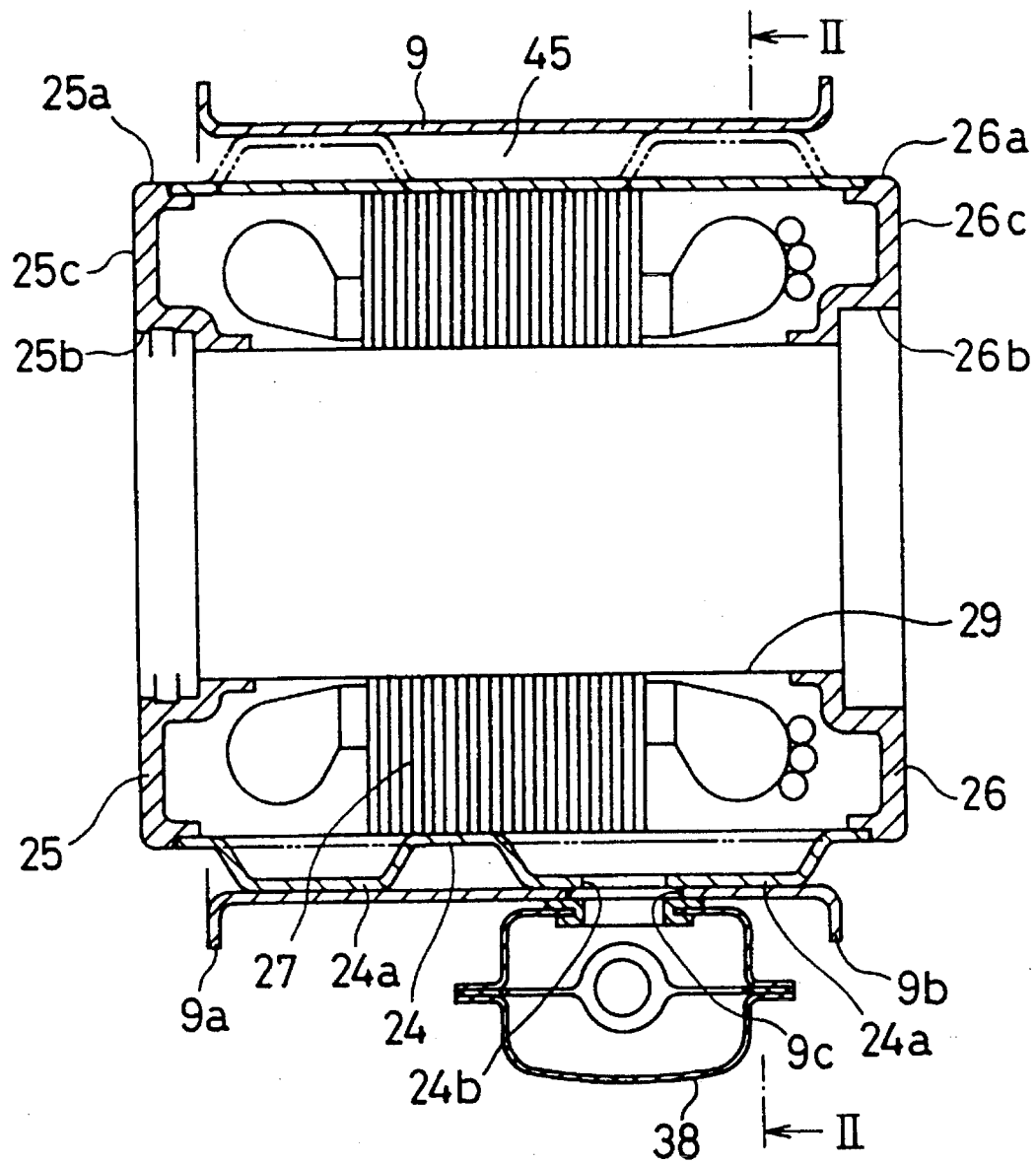
FIG. 1 is a cross-sectional view of a stator assembly of a canned motor according to the present invention.
Figure 2:
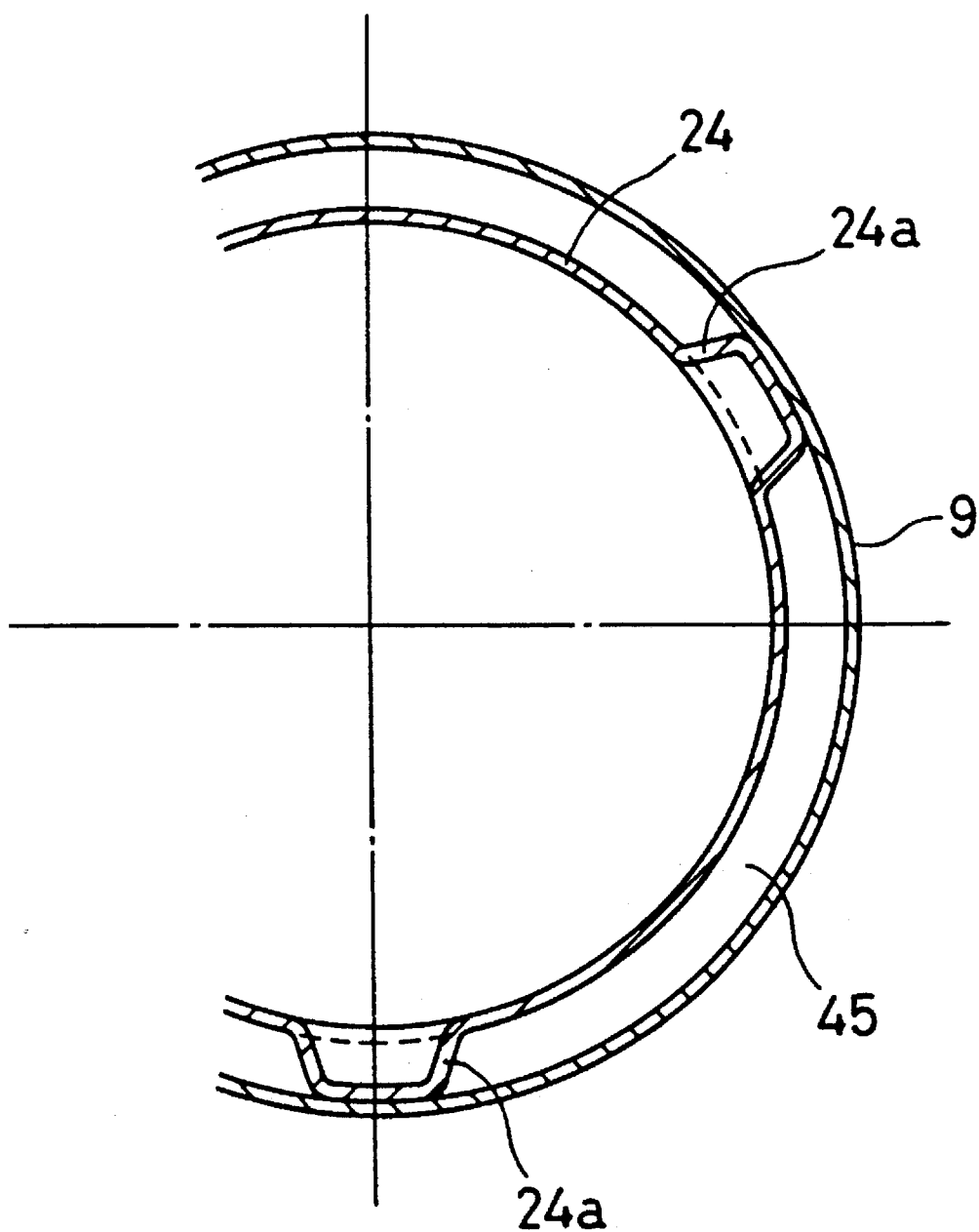
FIG. 2 is a fragmentary cross-sectional view taken along line II—II of FIG. 1.

As shown in FIG. 1, a canned motor according to the present invention has a stator assembly. The stator assembly includes a stator 27, an outer frame casing 24 fitted over the stator 27, side frame members 25, 26 welded to respective open ends of the outer frame casing 24, and a can 29 fitted in the stator 27 and welded to the side frame members 25, 26. The outer frame casing 24 has hollow ribs 24a which project radially outwardly by being pressed. As shown in FIG. 2, each of the hollow ribs 24a has a substantial trapezoidal cross section as viewed in plan, and is held tightly against the inner circumferential surface of an outer cylinder 9.

The outer frame casing 24 and the outer cylinder 9 are welded to each other at the hollow ribs 24a with an annular space 45 defined radially therebetween. One of the hollow ribs 24a has a hole 24b defined therein, and the outer cylinder 9 has a hole 9c defined therein in registry with the hole 24b. The holes 24b, 9c are held in communication with each other through a water-resistant seal which is provided by the welding between the outer frame casing 24 and the outer cylinder 9, against the pressure of a fluid which fills the annular space 45. Leads for connection to a power supply extend through the holes 24b, 9c into a terminal box 38 which is mounted on the outer circumferential surface of the outer cylinder 9.

The outer cylinder 9 has a pair of flanges 9a, 9b on respective axial open ends thereof. The flanges 9a, 9b serve as attachments for being attached to components which keep a fluid within a pump (described later on).

The side frame members 25, 26 have respective socket-and-spigot joints 25a, 26a which is fitted with a pump assembly (described later on). Each of the outer cylinder 9 and the outer frame casing 24 is made of thin sheet metal.

The flanges 9a, 9b on the axial ends of the outer cylinder 9 are identical in shape to each other, and the axial dimension between an end surface 25c of the side frame member 25 and the flange 9a is the same as the axial dimension between an end surface 26c of the side frame member 26 and the flange 9b.

Figure 3:
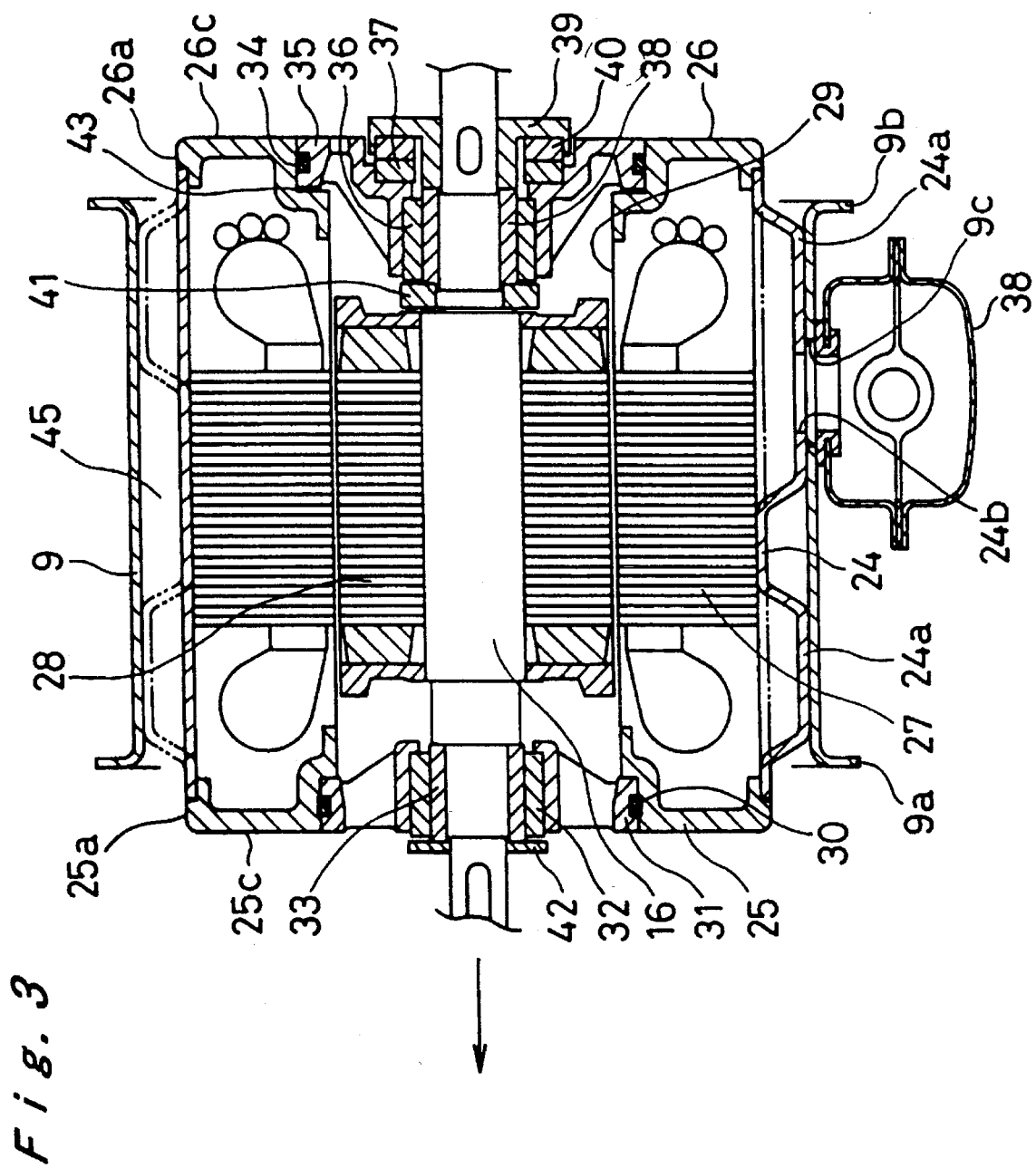
FIG. 3 is a cross-sectional view of the canned motor according to the present invention.

As shown in FIG. 3, the motor includes a rotor assembly including a rotor 28 and a shaft 16 fitted in the rotor 28 with a shrunk fit. The shaft 16 extends axially beyond the axial ends of the rotor 28.

A bearing which supports the rotor assembly on an anti-thrust load side and components associated with such a bearing will be described below.

A radial bearing 36 and a stationary thrust bearing 37 are mounted in a bearing bracket 35. The radial bearing 36 has an end surface serving as a stationary thrust sliding surface. The stationary thrust bearing 37 has an end surface which also serves as a stationary thrust sliding surface. A rotatable thrust bearing 40 and a thrust collar 41 both serving as rotatable thrust sliding surfaces are disposed one on each side of the radial bearing 36 and the stationary thrust bearing 37. The rotatable thrust bearing 40 is fixed to a thrust disk 39 which is fixed to the shaft 16 directly or through a component by a threaded surface and a nut on one end of the shaft 16.

The bearing bracket 35 is inserted in a socket defined in the side frame member 26 with an resilient O-ring 34 interposed therebetween. The bearing bracket 35 is held against the radial bearing 36 through a resilient gasket 43. A sleeve 38 is fixed to the shaft 16 and supported by the radial bearing 36, the sleeve 38 and the radial bearing 36 acting as a sliding assembly.

A bearing which supports the rotor assembly on a thrust load side and components associated with such a bearing will be described below.

A radial bearing 32 is mounted in a bearing bracket 31. A sleeve 33 is fixed to the shaft 16 and supported by the radial bearing 32, the sleeve 33 and the radial bearing 32 acting as a sliding assembly. The sleeve 33 is axially held against a washer 42 which is fixed to the shaft 16 directly or through a component by a threaded surface and a nut on the other end of the shaft 16. The washer 42 has an outer diameter which is substantially the same as the outer diameter of the radial bearing 32.

The bearing bracket 31 is inserted in a socket defined in the side frame member 25 with a resilient O-ring 30 interposed therebetween. The bearing bracket 31 is held against the side frame member 25.

The above bearings and components associated therewith on both the thrust and anti-thrust load sides allow bearing material and dimensions to be changed with ease. Specifically, the bearings 32, 36 and the bearing brackets 31, 35 may be replaced in sets. The washer 42 is effective in preventing both the bearing brackets 31, 35 from being dislodged from the corresponding sockets in the side frame members 25, 26.

The sliding assemblies of the bearings 32, 36 are lubricated by the fluid which is handled by a pump that is used in combination with the canned motor.

Various combinations of the canned motor with a variety of pumps will be described below with reference to FIG. 4.

Figure 4:
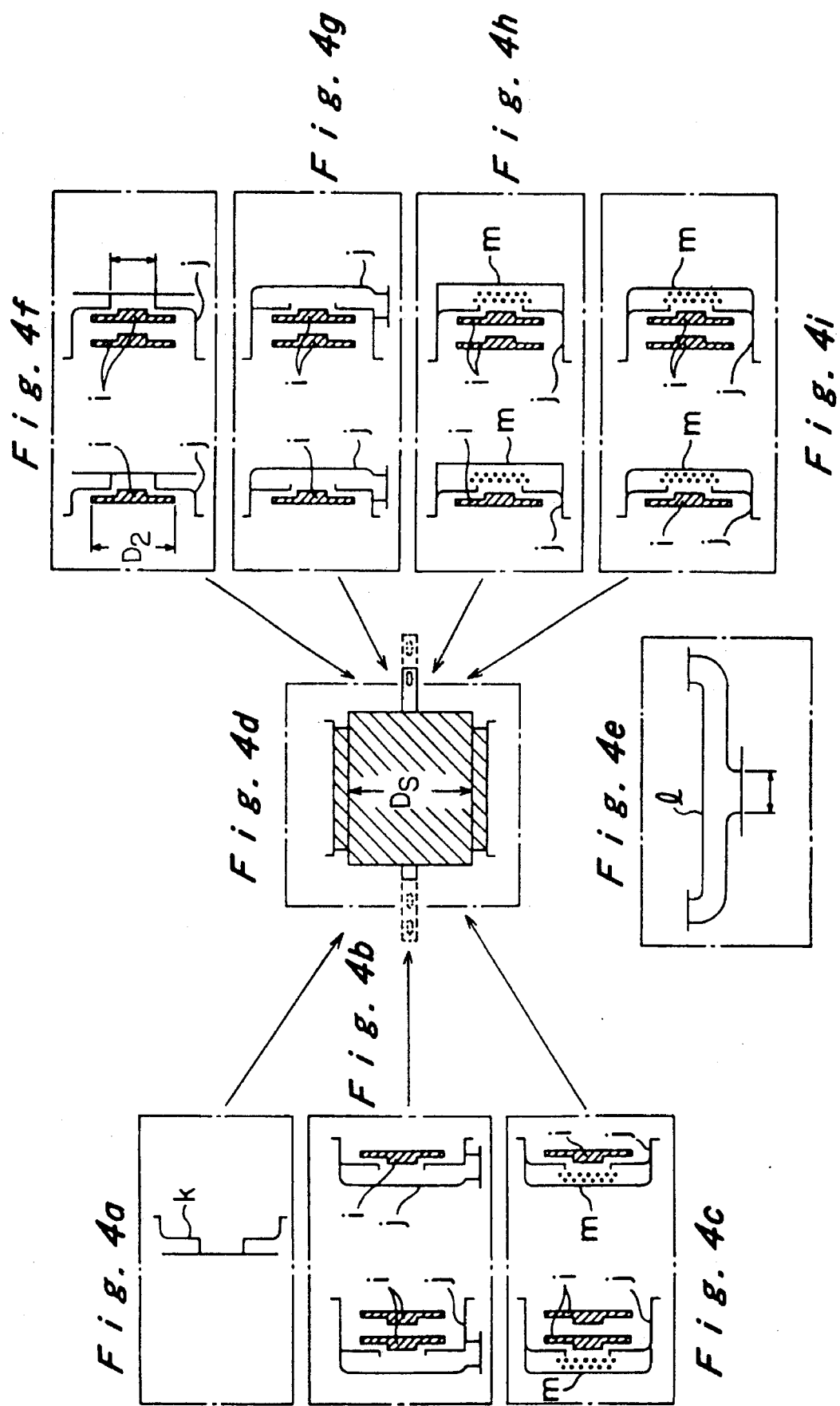
FIGS. 4(a–i) is a diagram showing combinations of the canned motor with various pumps.

Indicated by M at the center of FIG. 4 is a canned motor illustrated in FIG. 3. In FIG. 4, pump units each composed of casings and impellers are shown around the canned motor M. To construct an in-line full-circumferential flow pump, a pump unit in a block A comprising at least one impeller i and a pump casing j housing the impeller i, a unit in a block E comprising a casing k with a discharge port, and the canned motor M may be combined with each other.

To construct a double-suction full-circumferential flow pump, a pump unit in a block B comprising at least one impeller i and a pump casing j housing the impeller i, a pump unit in a block F comprising at least one impeller i and a pump casing j housing the impeller i, a header pipe 1 in a block H, and the canned motor M may be combined with each other, with a short discharge pipe being welded to the outer cylinder of the canned motor M. To construct a vertical submerged pump, a pump unit in a block C comprising at least one impeller i and a pump casing j with a strainer m, the unit in the block E, and the canned motor M may be combined with each other. To construct a horizontal submerged pump, a pump unit in a block D comprising at least one impeller i and a pump casing j with a strainer m, a pump unit in a block G comprising at least one impeller i and a pump casing j with a strainer m, and the canned motor M may be combined with each other.

Detailed structures of the canned motor combined with various pumps will be described below with reference to FIGS. 5 through 13.

Figure 5:
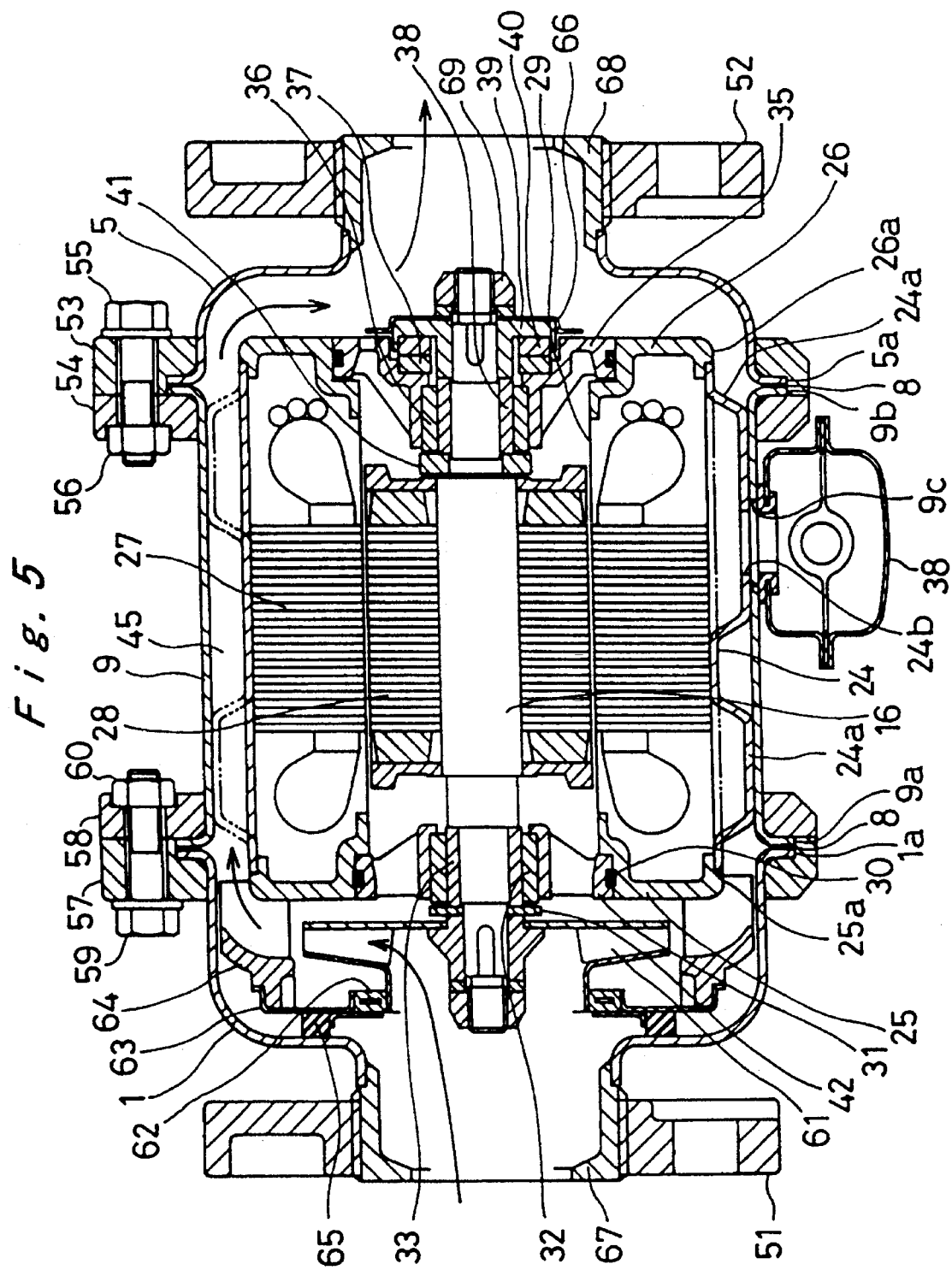
FIG. 5 is a cross-sectional view of the canned motor used in combination with a full-circumferential flow in-line pump.

FIG. 5 shows in cross section a full-circumferential flow in-line pump which incorporates the canned motor according to the present invention. The construction of the canned motor itself is identical to that of the canned motor shown in FIG. 3 and will not be described in detail below.

An outer suction casing 1 has a flange 1a on an open end thereof which is held against the flange 9a of the outer cylinder 9. The flanges 9a, 1a are gripped by clamping flanges 57, 58 with a seal member 8 interposed therebetween. The clamping flanges 57, 58 are fastened to each other by a bolt 59 and a nut 60.

The outer suction casing 1 has a suction nozzle 67 in its end opposite to the flange 1a. An impeller 61 is mounted on the end of the shaft 16 on the thrust load side. A guide 64 is mounted on the side frame member 25 through the socket-and-spigot joint 25a. An inner casing 63 engages the guide 64 in highly concentric relation therewith. A liner ring 62 is mounted in the inner casing 63, and the impeller 61 is held with a slight clearance against the liner ring 62. The inner casing 63 and the outer suction casing 1 are spaced from each other with an resilient seal member 65 interposed therebetween.

An outer discharge casing 5 has a flange 5a on an open end thereof which is held against the flange 9b of the outer cylinder 9. The flanges 9b, 5a are gripped by clamping flanges 53, 54 with a seal member 8 interposed therebetween. The clamping flanges 53, 54 are fastened to each other by a bolt 55 and a nut 56. The outer discharge casing 5 has a discharge nozzle 68 in its end opposite to the flange 5a. A sand deflector 66 is mounted on the end of the shaft 16 on the anti-thrust load side.

Each of the outer suction casing 1, the inner casing 63, and the outer discharge casing 5 is made of sheet metal.

Operation of the full-circumferential flow in-line pump shown in FIG. 5 will briefly be described below. A fluid drawn in through the suction nozzle 67 is introduced into the impeller 61. The fluid discharged from the impeller 61 flows radially outwardly through the guide 64 of the inner casing 63 and then axially into the annular space or passage 45 defined between the outer cylinder 9 and the outer frame casing 24 of the canned motor. The fluid then flows through the annular passage 45 into the outer discharge casing 5, and then is discharged through from the discharge nozzle 68.

Figure 6:
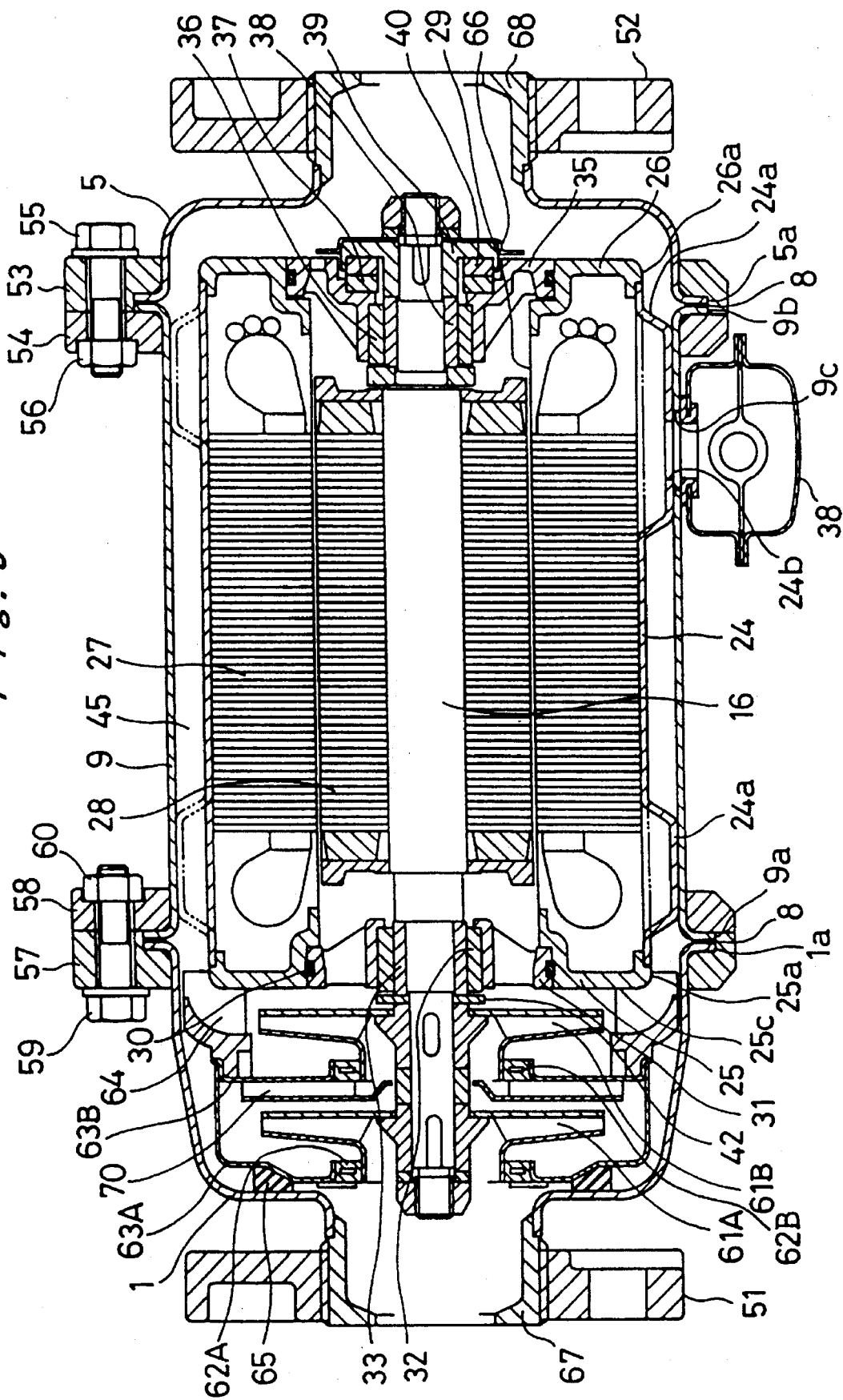
FIG. 6 is a cross-sectional view of the canned motor used in combination with a two-stage full-circumferential flow in-line pump.

FIG. 6 shows in cross section another full-circumferential flow in-line pump which incorporates the canned motor according to the present invention, the in-line pump being of a two-stage structure having two tandem impellers on the thrust load. The construction of the canned motor itself is identical to that of the canned motor shown in FIG. 3 and will not be described in detail below. The two-stage in-line pump shown in FIG. 6 has two impellers 61A, 61B in an outer suction casing 1. The outer suction casing 1 accommodates a first inner casing 63A which houses the first impeller 61A and a second inner casing 63B which houses the second impeller 61B.

The first inner casing 63A also houses a return blades 70 for guiding a fluid from the first impeller 61A into the second impeller 61B. A guide 64 is mounted on the second inner casing 63B for guiding the fluid discharged from the impeller 61B to flow from a radially outward direction into an axial direction. The other structural and functional details of the two-stage in-line pump shown in FIG. 6 are the same as those of the in-line pump shown in FIG. 5.

The two-stage in-line pump shown in FIG. 6 is equivalent to the in-line pump shown in FIG. 5 with another impeller added thereto. The two-stage in-line pump shown in FIG. 6 can produce a higher pump head, and shares a number of components with the in-line pump shown in FIG. 5.

Figure 7:
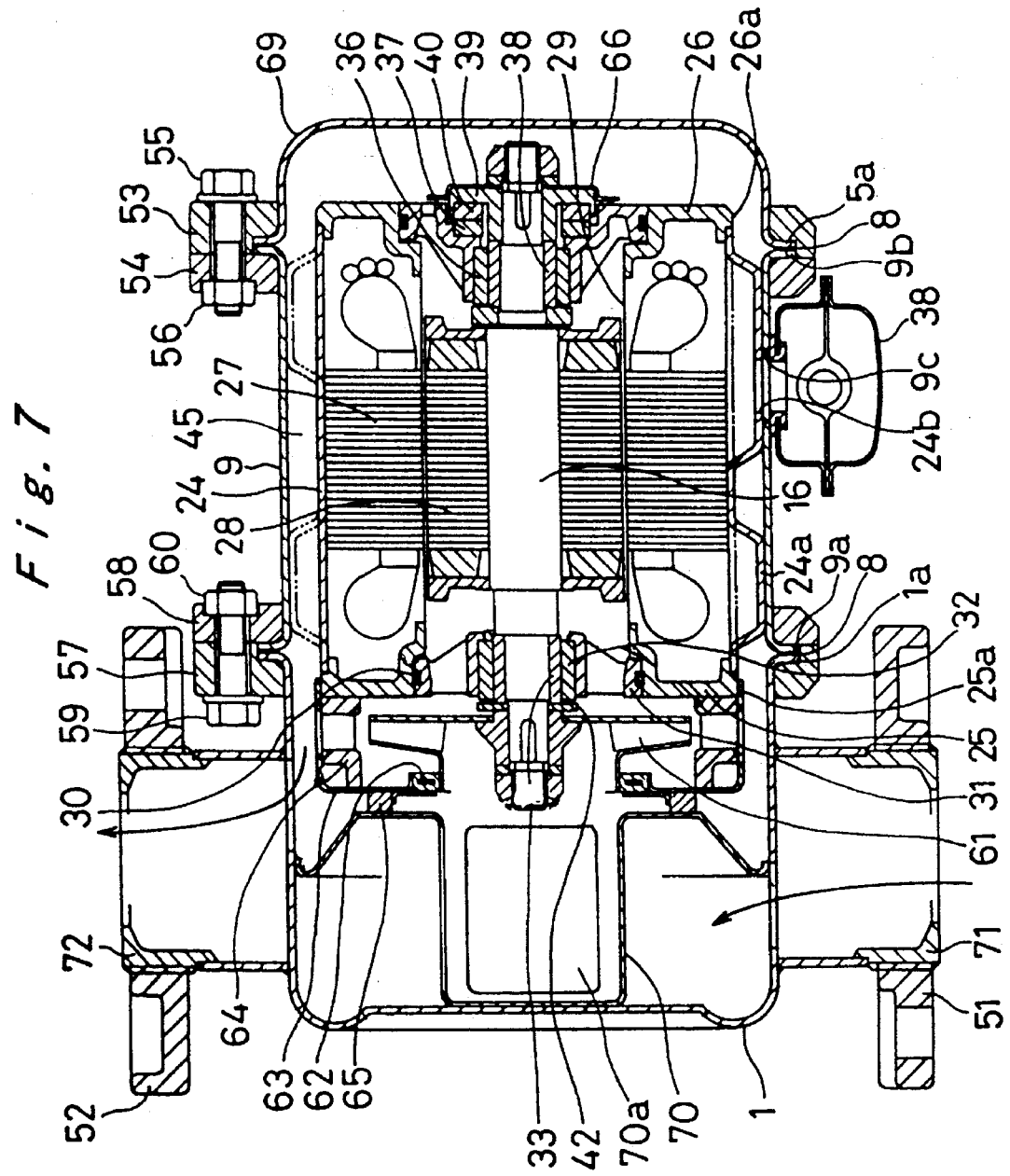
FIG. 7 is a cross-sectional view of the canned motor used in combination with a line pump different from the full-circumferential flow in-line pump shown in FIG. 5.

FIG. 7 shows in cross section a line pump which incorporates the canned motor according to the present invention, the line pump being of a structure different from the in-line pump shown in FIG. 5. Specifically, the line pump shown in FIG. 7 has a pump structure on the thrust load side which is different from that shown in FIG. 5 in that the motor has its axis extending perpendicularly to the piping. The canned motor shown in FIG. 7 is identical to the canned motor shown in FIG. 5.

A pump cover 69 is mounted on the end of the canned motor on the anti-thrust load side, and an outer suction casing 1 is mounted on the end of the canned motor on the thrust load side. A partition wall 70 is disposed in and welded to the outer suction casing 1. An inner casing 63 is fitted over the side frame member 25 and joined thereto by the socket-and-spigot joint 25a in concentric relation to a pump assembly.

The pump assembly includes an impeller 61 disposed in the inner casing 63 and fixedly mounted on the end of the shaft 16 on the thrust load side. A guide 64 is also disposed in the inner casing 63, and a liner ring 62 is mounted in the inner casing 63. The impeller 61 is held with a slight clearance against the liner ring 62. The inner casing 63 and the partition wall 70 are spaced from each other with an resilient seal member 65 interposed therebetween.

The outer suction casing 1 has a suction nozzle 71 and a discharge nozzle 72 on its cylindrical side wall in diametrically opposite relation to each other. Suction and discharge flanges 51, 52 are joined respectively to the suction nozzle 71 and the discharge nozzle 72.

The line pump shown in FIG. 7 operates as follows: A fluid drawn in through the suction nozzle 71 is introduced through a suction port into the outer suction casing 1. The fluid thus flows through a suction opening 70a defined in the partition wall 70 and the inner casing 63 into the impeller 61. The fluid discharged from the impeller 61 flows radially outwardly through the guide 64 where the fluid is subject to a pressure buildup, and then flows axially into a space defined between the outer suction casing 1 and the inner casing 63. The fluid is then discharged through a discharge port defined in the outer suction casing 1 and the discharge nozzle 72 into a discharge pipe (not shown). Part of the fluid discharged from the impeller 61 flows into an annular space 45 defined between the outer cylinder 9 and the outer frame casing 24 of the canned motor for cooling the canned motor. The fluid flowing into the annular space 45 circulates so as not to remain stagnant in the annular space 45.

Figure 8:
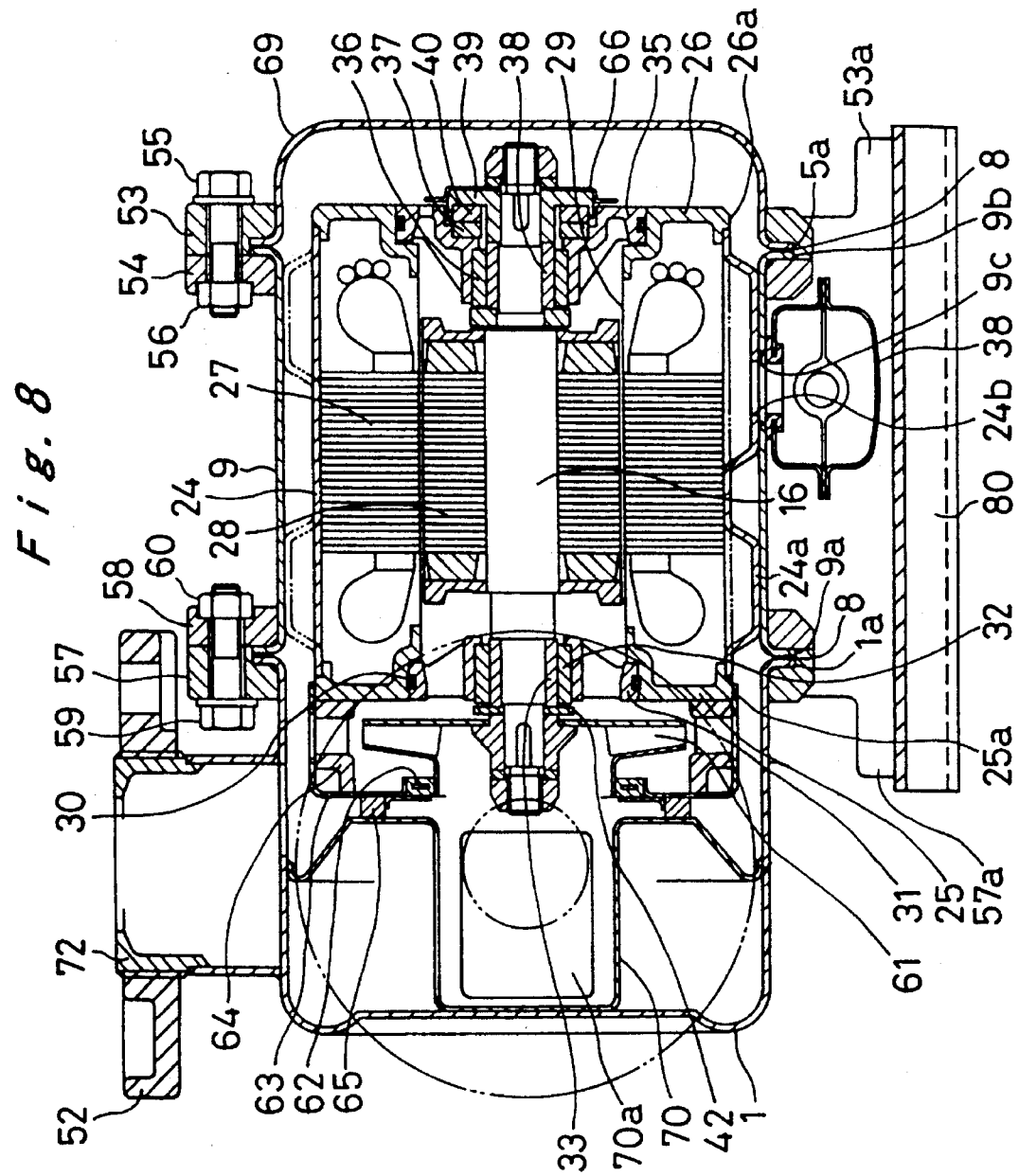
FIG. 8 is a cross-sectional view of the canned motor used in combination with a side-top pump with legs.

FIG. 8 shows in cross section a side-top pump with legs which incorporates the canned motor according to the present invention. The side-top pump has a pump structure on the thrust load side which is basically the same as that shown in FIG. 7. However, whereas the suction and discharge ports are 180° spaced apart from each other in FIG. 7, the side-top pump shown in FIG. 8 has suction and discharge ports that are 90° spaced apart from each other. A pump cover 69, which is identical to the pump cover 69 shown in FIG. 7, is mounted on the end of the canned motor on the anti-thrust load side. Legs 57a, 53a are joined respectively to the clamping flanges 57, 53, and fixed to a pump base 80.

The canned motors shown in FIGS. 5, 7, and 8 are identical to each other.

Figure 9:
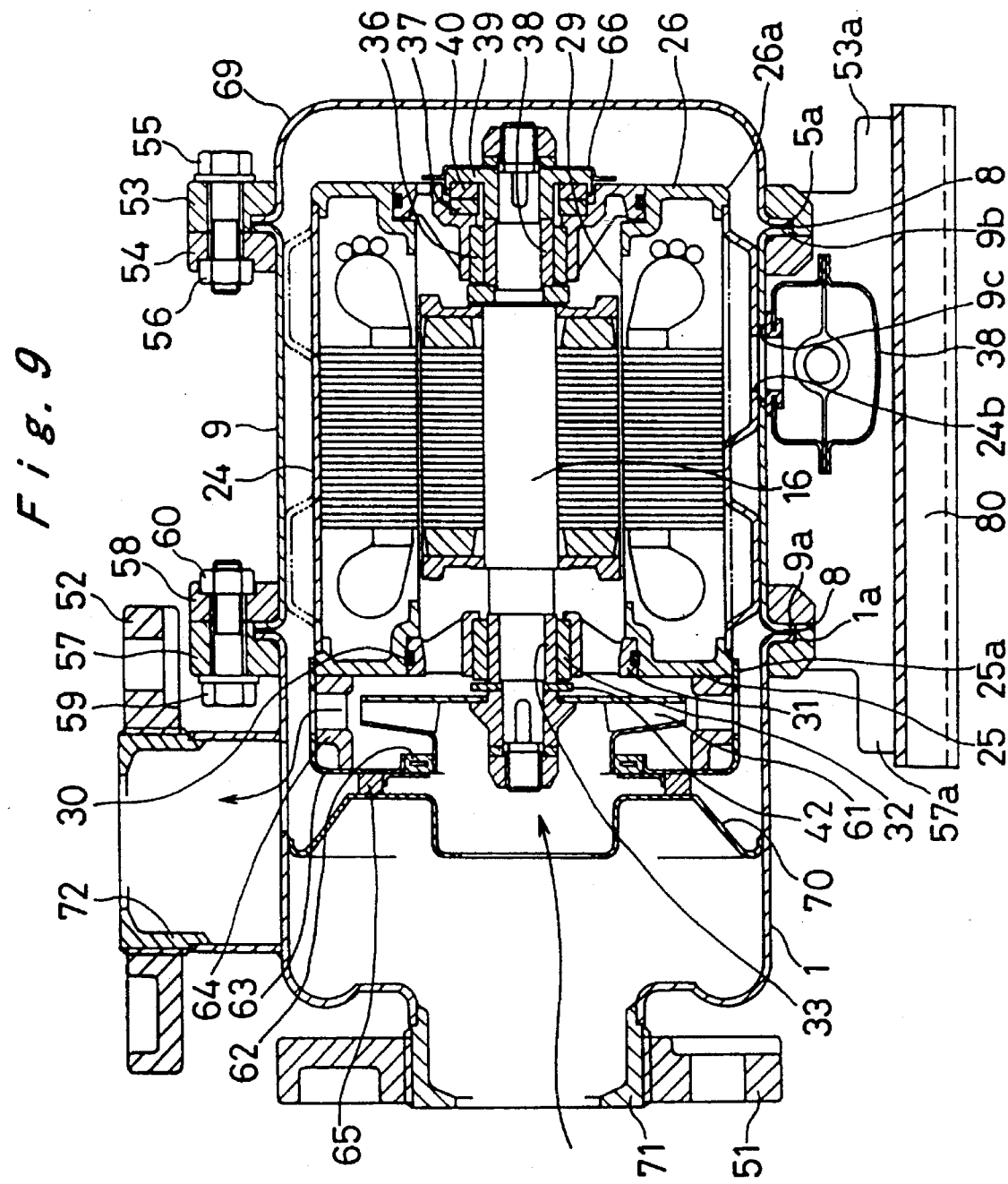
FIG. 9 is a cross-sectional view of the canned motor used in combination with an end-top pump with legs.

FIG. 9 shows in cross section an end-top pump with legs which incorporates the canned motor according to the present invention. The end-top pump has a pump structure on the thrust load side which is different from that shown in FIG. 8. Specifically, a suction nozzle 71 is mounted on the bottom of an outer casing 1 which has substantially cylindrical-cup shape, and a discharge nozzle 72 is mounted on a cylindrical wall of the outer casing 1. Suction and discharge flanges 51, 52 are joined respectively to the suction nozzle 71 and the discharge nozzle 72. A partition wall 70 is disposed in and welded to the outer casing 1. The other details of the pump shown in FIG. 9 are the same as those of the pump shown in FIG. 8.

Figure 10:
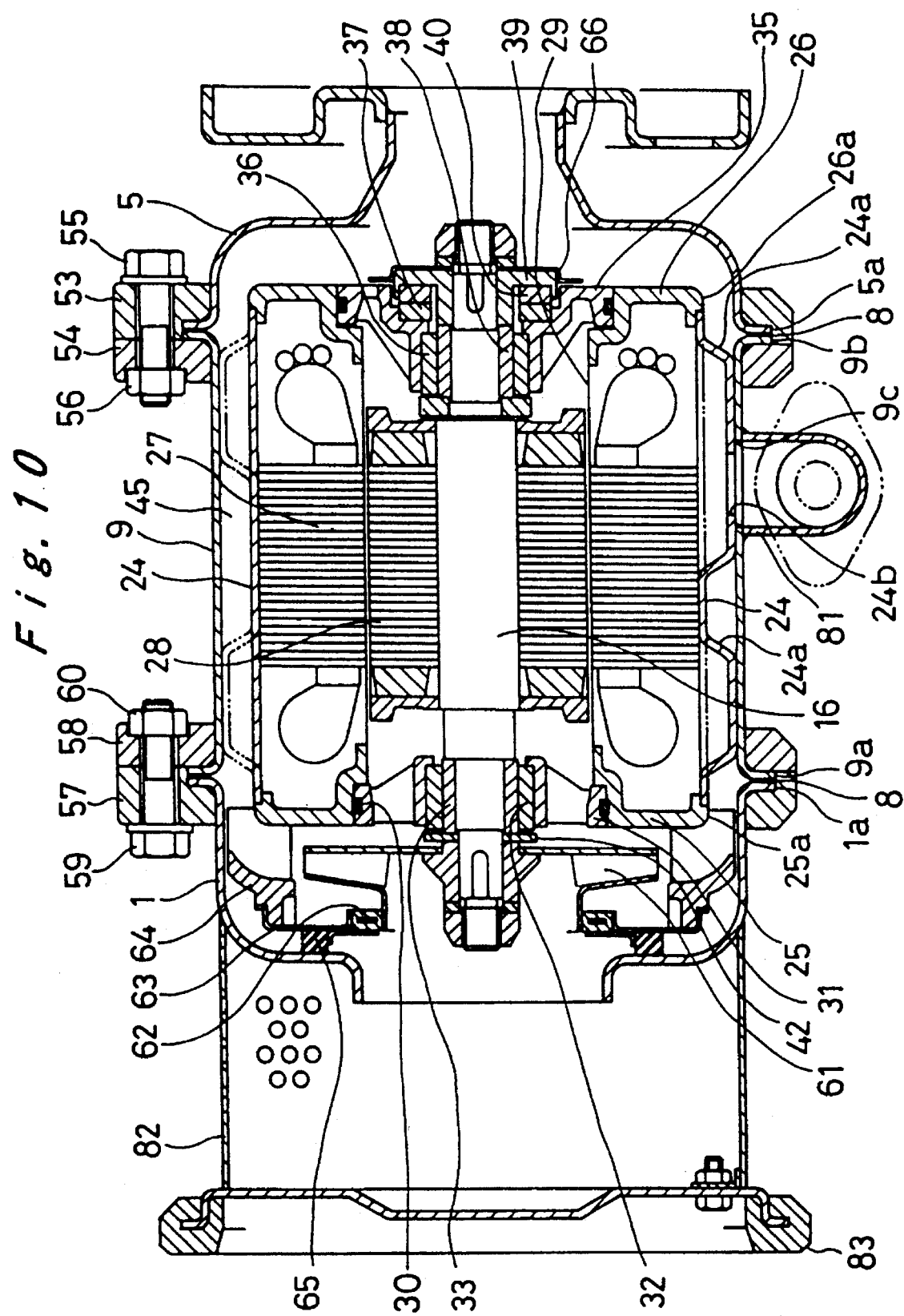
FIG. 10 is a cross-sectional view of the canned motor used in combination with a vertical submerged pump.

FIG. 10 shows in cross section a vertical submerged pump which incorporates the canned motor according to the present invention.

The vertical submerged pump shown in FIG. 10 differs from the pump shown in FIG. 5 in that a short pipe 81 for guiding a submerged cable is welded to an outer circumferential surface of the outer cylinder 9 in registry with a hole 9c for passing power supply leads, and a strainer 82 and a pump base 83 are mounted on an outer suction casing 1.

According to the embodiment shown in FIG. 10, a full-circumferential flow submerged pump is constructed with the strainer 82 mounted on the outer suction casing 1 and a submerged cable connected to energize the canned motor. In operation, a fluid drawn in from the strainer 82 into the outer suction casing 1 is pressurized by the impeller 61 and flows through the guide 64 into the annular passage 45. Thereafter, the fluid flows from the annular passage 45 into the outer discharge casing 5, from which the fluid is discharged through the discharge nozzle.

Figure 11:
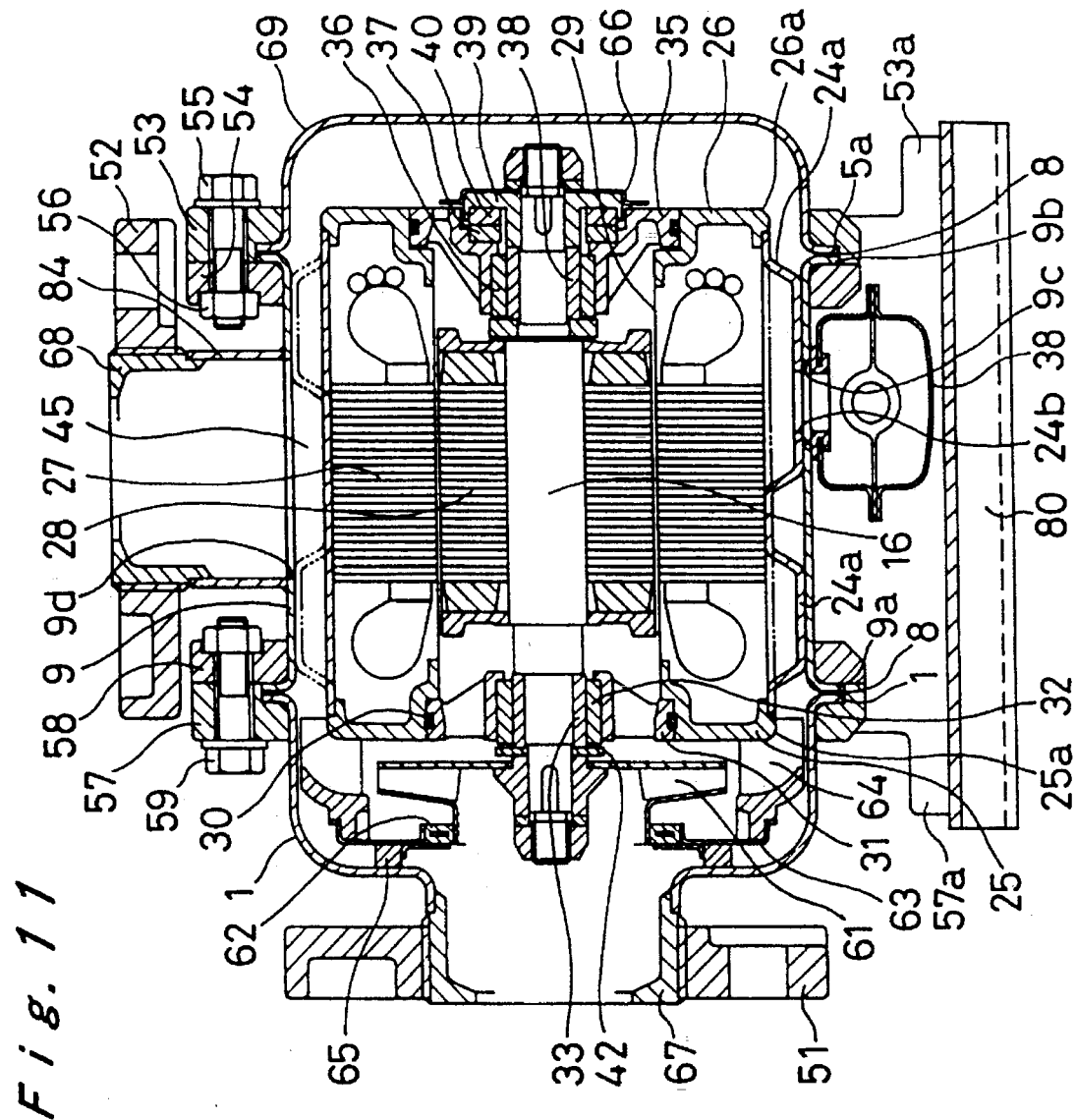
FIG. 11 is a cross-sectional view of the canned motor used in combination with an end-top pump with legs different from the pump shown in FIG. 9.

FIG. 11 shows in cross section an end-top pump with legs which incorporates the canned motor according to the present invention. The end-top pump shown in FIG. 11 is the same as the pump shown in FIG. 9 in that the inner casing 63 and the impeller 61 are disposed in the outer suction casing 1, but differs therefrom in that a short discharge pipe is mounted on the outer cylinder 9. More specifically, an outer circumferential wall of the outer cylinder 9 has a hole 9d for discharging the fluid being handled, and a short discharge pipe 84 is welded to an outer circumferential surface of the outer cylinder 9 in registry with the hole 9d. The pump structure shown in FIG. 11 is smaller in overall size than the pump shown in FIG. 9. A pump cover 69 mounted on the end of the canned motor on the anti-thrust load side is the same as those shown in FIGS. 7 through 9.

Figure 12:
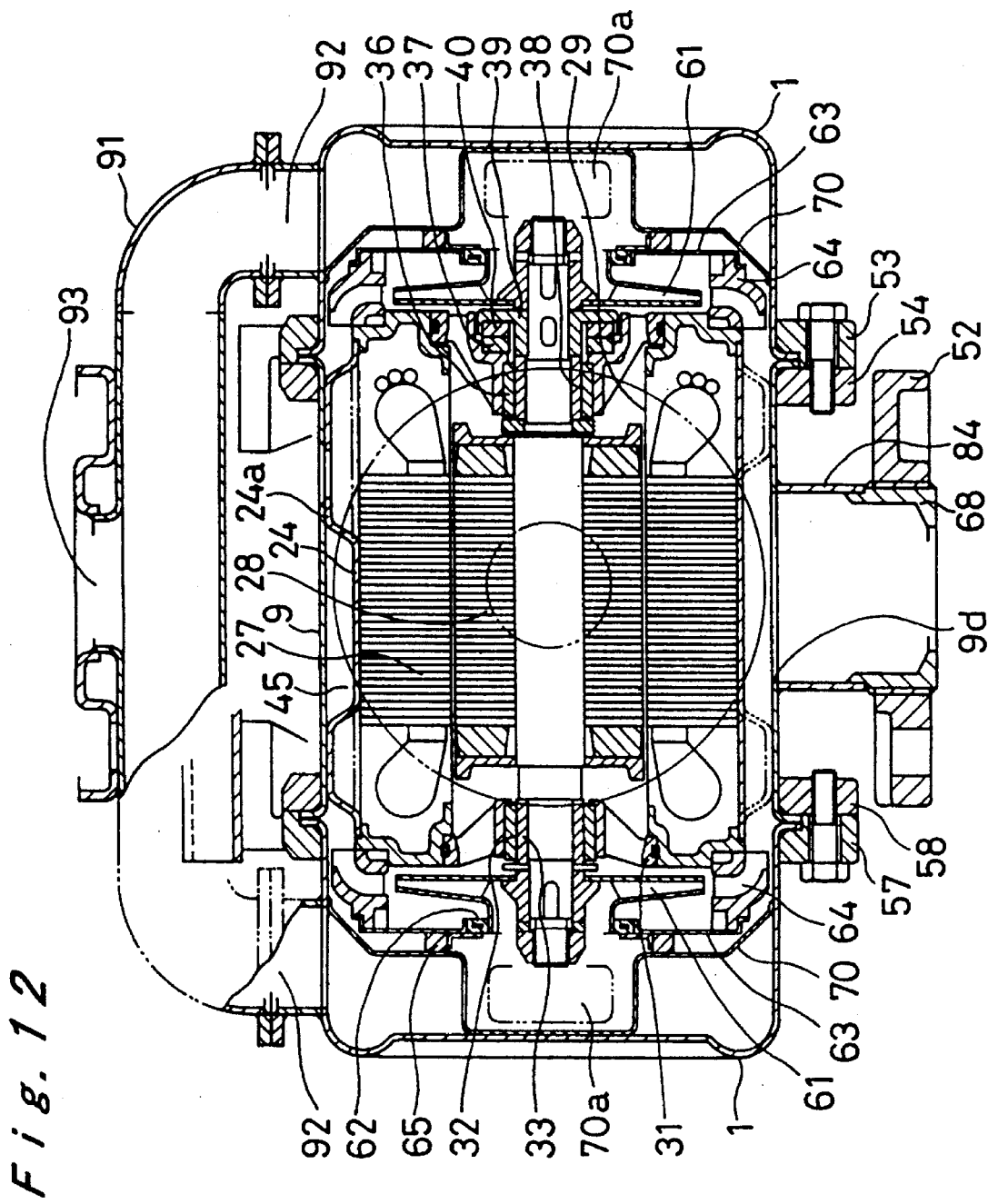
FIG. 12 is a cross-sectional view of the canned motor used in combination with a double-suction pump.

FIG. 12 shows in cross section a full-circumferential flow double-suction pump with legs which incorporates the canned motor according to the present invention. The double-suction pump shown in FIG. 12 has an outer suction casing 1 and pump components disposed one on each side of the canned motor. The outer suction casings 1 have respective suction ports 92 interconnected by a suction header pipe 91 having a suction port 93 defined therein.

Partition walls 70 are fixedly disposed in the respective outer suction casings 1. Inner casings 63 having respective guides 64 which serve as guide vanes or volutes for guiding a fluid therethrough are disposed in the partition walls 70, respectively. A short discharge pipe 84 with a discharge flange 52 fixed thereto is connected to a central region of the outer cylinder 9. The other details of the double-suction pump shown in FIG. 12 are the same as those of the pump shown in FIG. 5.

The double-suction pump shown in FIG. 12, which is of the full-circumferential flow type, operates as follows:

A fluid drawn in through the suction port 93 is divided into two fluid flows by the header pipe 91, which are introduced from the suction ports 92 into the respective outer suction casings 1. The fluid flows introduced into the outer suction casings 1 pass through suction openings 70a defined in the respective partition walls 70 into the impellers 61. The fluid discharged from the impellers 61 flows radially outwardly through the guides 64 and then axially into an annular space or passage 45 defined between the outer cylinder 9 and the outer frame casing 24 of the canned motor. The fluid flows passing through the annular passage 45 are combined with each other and then discharged through an opening 9d of the outer cylinder 9 from the short discharge pipe 84.

Figure 13:
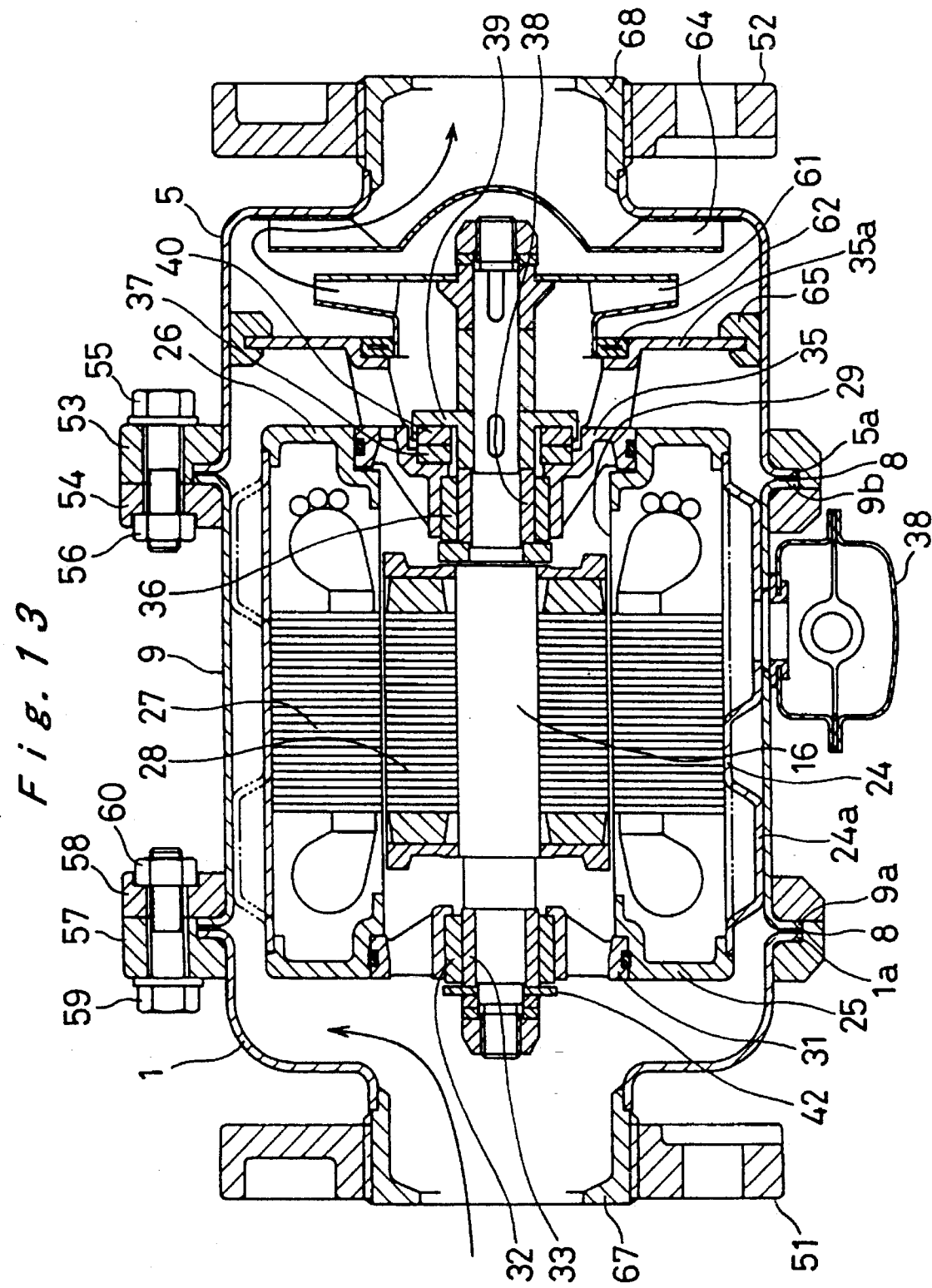
FIG. 13 is a cross-sectional view of the canned motor used in combination with an in-line pump which is subject to a high fluid pressure in its suction port.

FIG. 13 shows in cross section a full-circumferential flow in-line pump which incorporates the canned motor according to the present invention, the in-line pump being subject to a high fluid pressure in its suction port. An outer suction casing 1 has a flange 1a on an open end thereof which is held against a flange 9a of an outer cylinder 9. The flanges 9a, 1a are gripped by clamping flanges 57, 58 with a seal member 8 interposed therebetween. The clamping flanges 57, 58 are fastened to each other by a bolt 59 and a nut 60. The outer suction casing 1 has a suction nozzle 67 in its end opposite to the flange 1a.

An outer discharge casing 5 has a flange 5a on an open end thereof which is held against a flange 9b of the outer cylinder 9. The flanges 9b, 5a are gripped by clamping flanges 53, 54 with a seal member 8 interposed therebetween. The clamping flanges 53, 54 are fastened to each other by a bolt 55 and a nut 56. The outer discharge casing 5 has a discharge nozzle 68 in its end opposite to the flange 5a. An impeller 61 is mounted on the end of the shaft 16 on the anti-thrust load side. A bearing bracket 35 is inserted in a socket defined in a side frame member 26 on the anti-thrust load side, the bearing bracket 35 being integral with an inner casing 35a. A liner ring 62 is mounted in the inner casing 35a, and the impeller 61 is held with a slight clearance against the liner ring 62. The inner casing 35a and the outer discharge casing 5 are spaced from each other with a resilient seal member 65 interposed therebetween.

In operation, a fluid drawn in through the outer suction casing 1 flows through an annular passage 45 into the outer discharge casing 5, in which the fluid is pressurized by the impeller 61. Thereafter, the fluid is discharged from the discharge nozzle 68. Therefore, the fluid pressure which is increased by the impeller 61 is not applied to a can 29 of the canned motor. The pump structure shown in FIG. 13 is thus suitable particularly to instances where a high fluid pressure is applied to the suction port of the pump.

With the present invention, as described above, one canned motor can be used in combination with any of various pump designs. The canned motor according to the present invention can be combined with any of a greater variety of pump structures by simply defining holes in the complete motor and welding additional components thereto. Consequently, the complete canned motor and hence its manufacturing process can be shared by various pump designs, with the result that canned motors and hence various pump structures can be manufactured at a high production rate.

Although certain preferred embodiments of the present invention has been shown and described in detail, it should be understood that various changes and modifications may be made therein without departing from the scope of the appended claims.

What is claimed is:

1. A canned motor for use in a pump, comprising:

a stator;

an outer frame casing disposed around said stator and having a pair of axial open ends;

a pair of side frame members welded to said open ends, respectively, of the outer frame casing;

a can fitted in said stator and joined to said side frame members;

a shaft rotatably disposed in said stator;

a rotor mounted on said shaft and disposed in said can; and an outer cylinder made of sheet metal disposed around said outer frame casing with an annular space defined therebetween, said outer cylinder being welded to said outer frame casing;

wherein said outer cylinder has a pair of flanges disposed respectively on axially spaced open ends thereof for attachment to components of a pump assembly and holding a fluid being handled within said outer cylinder, said outer cylinder having a hole defined in an outer circumferential wall thereof for passing leads for connection to a power supply.

2. A canned motor according to claim 1, wherein each of said side frame members has a socket-and-spigot joint for holding a pump assembly.

3. A canned motor according to claim 2, wherein said socket-and-spigot joint is provided to hold a portion serving as a liner ring.

4. A canned motor according to claim 1, wherein said outer frame casing is made of sheet metal and has a pressed hollow rib projecting radially outwardly and joined to said outer cylinder.

5. A canned motor according to claim 4, wherein said outer frame casing has a hole defined in said pressed hollow rib.

6. A canned motor according to claim 1, wherein said flanges on the axially spaced open ends of said outer cylinder are identical in shape and dimension to each other, and said flanges are axially spaced from respective end surfaces of said side frame members by identical axial dimensions.

7. A canned motor according to claim 1, wherein said outer cylinder has a discharge hole defined in the outer circumferential wall thereof for discharging said fluid from said annular space, further comprising a short discharge pipe welded to an outer circumferential surface of said outer cylinder in registry with said discharge hole.

8. A canned motor according to claim 1, further comprising:

a pair of bearing brackets fixed to said side frame members, respectively;

a pair of radial bearings supported by said bearing brackets, respectively, said shaft being rotatably supported by said radial bearings;

a pair of stationary thrust sliding surfaces disposed on respective axial ends of each of said radial bearings; and a pair of rotatable thrust sliding surfaces disposed one on each side of one of said radial bearings and held slidingly against said stationary thrust sliding surfaces;

wherein one of said side frame members, which is positioned on an anti-thrust load side, has a socket defined therein;

one of said bearing brackets is inserted in said socket and held axially against a corresponding one of said side frame members.

9. A canned motor according to claim 8, wherein the other of said side frame members, which is positioned on a thrust load side, has a socket defined therein, and the other of said bearing brackets is inserted in said socket and held axially against the other of said side frame members.

10. A pump comprising:

a canned motor unit comprising a stator, an outer frame casing disposed around said stator and having a pair of axial open ends, a pair of side frame members welded to said open ends, respectively, of the outer frame casing, a can fitted in said stator and joined to said side frame members, a shaft rotatably disposed in said stator, a rotor mounted on said shaft and disposed in said can, and an outer cylinder of sheet metal disposed around said outer frame casing with an annular space defined therebetween, said outer cylinder being welded to said outer frame casing, said outer cylinder having a pair of flanges disposed respectively on axially spaced open ends thereof for attachment to components of a pump assembly and holding a fluid being handled within said outer cylinder, said outer cylinder having a hole defined in an outer circumferential wall thereof for passing leads for connection to a power supply;

a plurality of pump units each having at least one impeller and a pump casing housing said impeller; and a casing unit having a casing with a discharge port defined therein, said canned motor unit being connectable to said pump units and to said casing unit to form a pump;

wherein the pump casing of each of said pump units may be connected to one of said flanges of the outer cylinder with said impeller fixedly mounted on an end of said shaft, and wherein one of the group consisting of said pump units and said casing unit may be connected to an other of said flanges of the outer cylinder to form said pump.

11. A pump according to claim 10, wherein each of said side frame members has a socket-and-spigot joint for holding a pump assembly.

12. A pump according to claim 11, wherein said socket-and-spigot joint is provided to hold a portion serving as a liner ring.

13. A pump according to claim 10, wherein said outer frame casing is made of sheet metal and has a pressed hollow rib projecting radially outwardly and joined to said outer cylinder.

14. A pump according to claim 13, wherein said outer frame casing has a hole defined in said pressed hollow rib.

15. A pump according to claim 10, wherein said flanges on the axially spaced open ends of said outer cylinder are identical in shape and dimension to each other, and said flanges are axially spaced from respective end surfaces of said side frame members by identical axial dimensions.

16. A pump according to claim 10, wherein said outer cylinder has a discharge hole defined in the outer circumferential wall thereof for discharging said fluid from said annular space, further comprising a short discharge pipe welded to an outer circumferential surface of said outer cylinder in registry with said discharge hole.

17. A pump according to claim 10, further comprising:

a pair of bearing brackets fixed to said side frame members, respectively;

a pair of radial bearings supported by said bearing brackets, respectively, said shaft being rotatably supported by said radial bearings;

a pair of stationary thrust sliding surfaces disposed on respective axial ends of each of said radial bearings; and a pair of rotatable thrust sliding surfaces disposed one on each side of one of said radial bearings and held slidingly against said stationary thrust sliding surfaces;

wherein one of said side frame members, which is positioned on an anti-thrust load side, has a socket defined therein;

one of said bearing brackets is inserted in said socket and held axially against a corresponding one of said side frame members.

18. A pump according to claim 17, wherein the other of said side frame members, which is positioned on a thrust load side, has a socket defined therein, and the other of said bearing brackets is inserted in said socket and held axially against the other of said side frame members.

19. A pump according to claim 10, further comprising fluid passage means for introducing fluid into said pump casings of said pump units disposed on the respective ends of said canned motor.

20. A pump according to claim 19, wherein said fluid passage means comprises a header pipe.

* * * * *

UNITED STATES PATENT AND TRADEMARK OFFICE
CERTIFICATE OF CORRECTION

PATENT NO. : 5,567,133
DATED : October 22, 1996
INVENTOR(S) : Makoto KOBAYASHI, et al.

It is certified that error appears in the above-indentified patent and that said Letters Patent is hereby corrected as shown below:

On the title page, in Item [75], the first inventor's last name should be:

-- Kobayashi--.

Also in Item [75], the inventor's name Koji Isemoto should be deleted.

Signed and Sealed this

Seventeenth Day of December, 1996

Attest:

BRUCE LEHMAN

*Attesting Officer*            *Commissioner of Patents and Trademarks*